Figure 1:
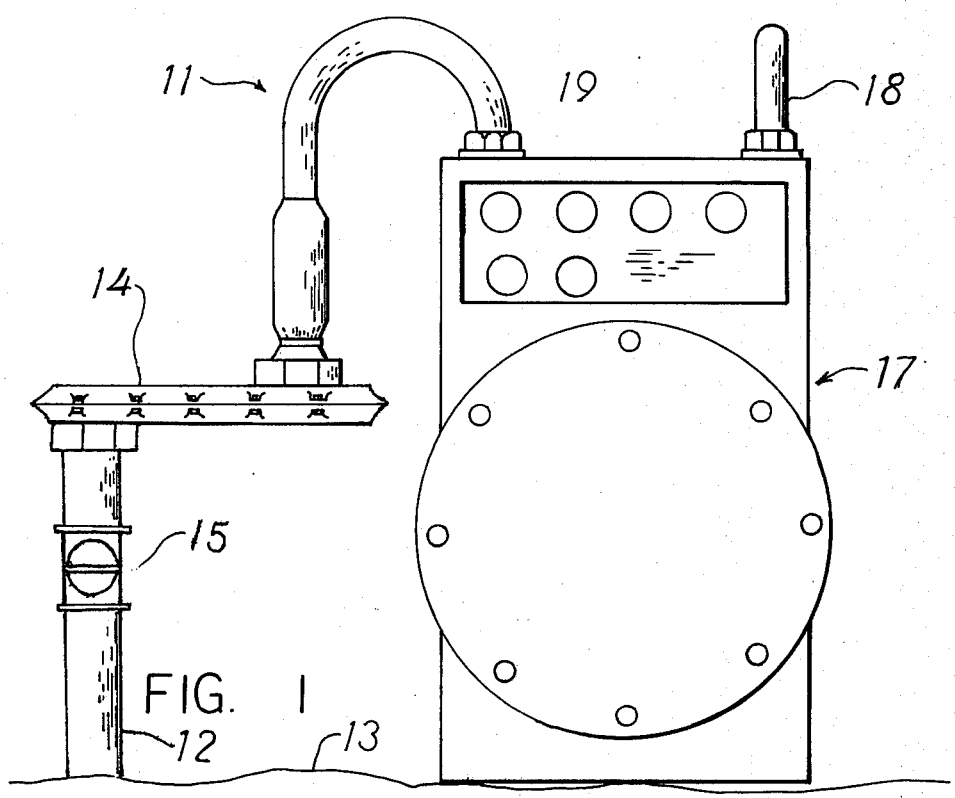

United States Patent [19]

Scott

[11] 4,335,907

[45] Jun. 22, 1982

[54] METER CONNECTION APPARATUS

[75] Inventor: Bernard E. Scott, Billings, Mont.

[73] Assignee: Industrial Systems, Inc., Billings, Mont.

[21] Appl. No.: 42,068

[22] Filed: May 24, 1979

[51] Int. Cl.$^3$ ............................................. F16L 43/00
[52] U.S. Cl. .................................. 285/157; 285/179; 285/342; 285/354
[58] Field of Search .................... 138/109; 4/DIG. 7; 285/177, 158, 174, 189, 157, 155, 30, 156, 175, 184, 342, 354; 403/187

[56] References Cited

U.S. PATENT DOCUMENTS

| | | | |
|---|---|---|---|
| 3,338,597 | 8/1967 | Mason | 285/177 X |
| 3,470,900 | 10/1969 | Rothouser | 285/157 X |
| 3,719,209 | 3/1973 | Rush et al. | 285/157 X |
| 3,853,339 | 12/1974 | Wilson | 285/157 |
| 3,931,992 | 1/1976 | Coel | 285/30 |
| 3,970,334 | 7/1976 | Campbell | 285/30 |

Primary Examiner—Dave W. Arola
Attorney, Agent, or Firm—Arthur L. Urban

[57] ABSTRACT

Meter connection apparatus including a generally semicircular conduit portion with substantially parallel straight conduit portions extending from the ends of the semicircular conduit portion, the semicircular conduit portion having a radius which is a plurality of the conduit diameter, a collar member affixed adjacent the free end of the first of the straight conduit portions, the collar member including a peripheral flange section, a compression nut carried by the first straight conduit portion and associated with the collar member, the compression nut including an internally threaded portion of a size encompassing and extending beyond the flange section of the collar member, the compression nut also including a portion of smaller size engageable with the flange section, an enlarged conduit portion extending from the second of the straight conduit portions, the enlarged conduit portion including an externally threaded section at its free end engageable with an internally threaded compression nut and the end portion of the externally threaded section engageable with a resilient seal member disposed between the enlarged conduit portion and the compression nut.

7 Claims, 2 Drawing Figures

U.S. Patent    Jun. 22, 1982    4,335,907

METER CONNECTION APPARATUS

This invention relates to a novel apparatus useful in the connection of a meter and more particularly relates to a new apparatus which facilitates installation of a utility meter.

Utility service to homes, apartments and other buildings generally includes a meter to measure the quantities supplied to the building. While such meters operate efficiently and with a minimum of maintenance for long periods of time, the installation thereof sometimes can be a troublesome operation. The location of the meter may vary with the particular installation so that many of the installations may require a custom design for the piping, conduit, etc.

Such custom installations not only take considerable skill but also require a great deal of time and effort. In addition, such custom installations require that the installer have a large inventory of piping components to insure that he can properly install the meter. If he does not have all of the necessary parts on his truck, a trip back to the parts supply will be required before he can complete the installation.

If the parts supply depot does not have the missing part or parts in stock, there may be a delay in completing the installation while the parts are in transit from a central supply source which may be in another city. A further complication then may occur if the customer is in a hurry for his installation and cannot understand why the installation is started but not finished so he can use the system.

Thus, present procedures for installing utility meters leave much to be desired. The time and effort required for each meter installation reduces the output and efficiency of the installers so that the cost of each installation is high. Also, the installers must be carefully trained so that they can deal with the widely different situations that they may encounter. Furthermore, costs are markedly increased by the necessity for maintaining a large inventory of spare parts.

The present invention provides a novel meter connection apparatus that simplifies the installation procedure. The meter connection apparatus of the invention assists in significantly reducing the time required for the meter installation. Also, the inventory of spare parts is reduced to a minimum. Thus, the number of single trip meter installations is substantially increased. Furthermore, much less training in meter installation is required for the installers. As a result, the cost of the meter installation is significantly reduced. The employment of the meter connection apparatus of the invention enables an installer to install more meters per day without the aggravation and frustration normally encountered when conventional meter installing techniques are utilized. Thus, fewer meter installers need be employed with additional savings.

The meter connection apparatus of the invention is simple in design. It can be fabricated from commercially available components and materials using conventional metal working techniques relatively inexpensively.

Figure 2:
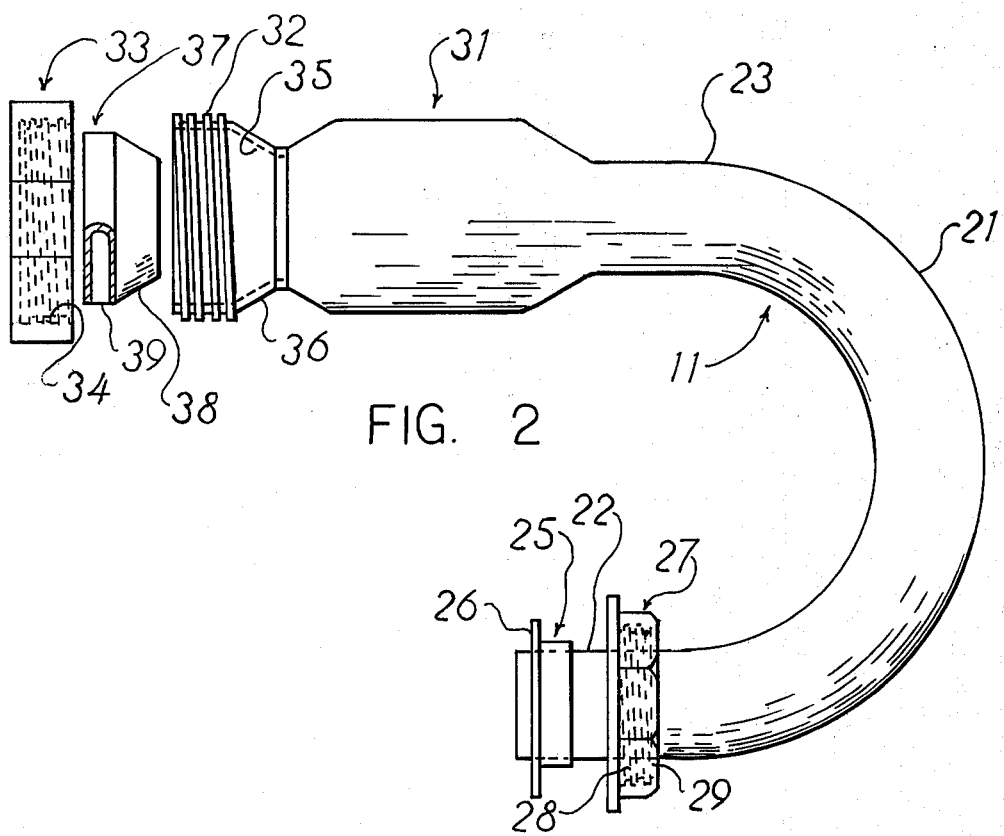

Other benefits and advantages of the novel meter connection apparatus of the present invention will be apparent from the following description and the accompanying drawings in which:

FIG. 1 is a schematic illustration of one form of the meter connection apparatus of the invention employed in the installation of a gas meter; and FIG. 2 is a greatly enlarged side view of the meter connection apparatus shown in FIG. 1 with parts separated.

As shown in the drawings, one form of the meter connection apparatus 11 of the present invention is incorporated in a meter installation including a service line 12 which runs underground from a gas main (not shown) buried along a roadway. The portion of the service line 12 emerging from the ground 13 is connected to a pressure regulator 14. Line 12 includes a shut-off valve 15.

The meter connection apparatus 11 of the invention has one end connected to the outlet of the pressure regulator 14 and the other end is connected to the inlet of a meter 17. The meter 17 has an outlet line 18 which extends through the wall 19 of a building to supply gas to furnaces, heaters, gas appliances such as ranges, dryers and the like.

The meter connection apparatus 11 includes a generally semicircular conduit portion 21 with substantially straight conduit portions 22 and 23 extending from the ends of the semicircular portion. The straight conduit portions 22 and 23 are substantially parallel to one another. The radius of the semicircular conduit portion 21 is a plurality of the conduit diameter, and preferably approximately three times the diameter.

A collar member 25 is affixed adjacent the free end of the straight conduit portion 22. Collar member 25 includes a peripheral flange section 26 extending outwardly therefrom. Advantageously, collar member 25 is positioned on the straight conduit portion 22 so that the free end of the conduit portion extends beyond the flange section of the collar member as shown.

A compression nut 27 is carried by the straight conduit portion 22 and advantageously held captive thereon by collar member 25 with which it is associated. Compression nut 27 includes an internally threaded portion 28 of a size to encompass and extend beyond the flange section 26 of the collar member 25. The threaded portion 28 of the compression nut 27 is engageable with a male threaded fitting (not shown) extending from the inlet of the meter 17. The compression nut 27 also includes a portion 29 of smaller size that is engageable with flange section 26 of the collar member 25 when the compression nut is tightened on the nipple of the meter 17.

An enlarged conduit portion 31 extends from the second straight conduit portion 23. Enlarged conduit portion 31 includes an externally threaded section 32 at its free end which is engageable with compression nut 33 having internal threads 34. The end portion of the externally threaded section and preferably the internal surface 35 thereof is engageable with a resilient seal member 37 disposed between the enlarged conduit 31 and the compression nut 33.

The enlarged conduit portion 31 advantageously extends from the second straight conduit portion 23 a significant distance beyond that which the collar member 25 extends from the first straight conduit portion 22. Also, it is advantageous if the enlarged conduit portion 31 includes a section 36 of reduced diameter adjacent the externally threaded section 32. The diameter of the enlarged conduit portion 31 preferably is approximately twice the diameter of the conduit of the semicircular portion 21.

The resilient seal member 37 advantageously is formed of an elastomeric material. Also, the seal member 37 includes a tapered section 38 adjacent the enlarged conduit portion 31 for engagement with internal surface 35. The opposite end of the seal member which is engageable with the compression nut 33 is advantageously of a generally cylindrical configuration, preferably with a metal covering 39.

In the employment of the meter connection apparatus 11 of the invention in the installation of a gas meter, a pressure regulator 14 is affixed to the service line 12 emerging from the ground 13 with a shut-off valve 15 preferably inserted in the service line. Compression nut 33 is slipped over a length of pipe extending from the pressure regulator 14 with the threaded section of the compression nut 33 extending away from the regulator.

Thereafter, the connection apparatus 11 is positioned above the pressure regulator 14 with the enlarged conduit portion 31 disposed directly above the threaded section 34 of the compression nut 33. Resilient seal member 37 is inserted between the compression nut 33 and the end portion of the enlarged conduit portion 31 with the tapered section 38 of the seal member facing toward the internal surface 35 of the enlarged conduit portion. The compression nut 33 is then threaded onto the enlarged conduit portion 31.

A gas meter is next positioned adjacent the opposite end of the connection apparatus 11 with the inlet of the meter 17 disposed directly below the free end of the straight conduit portion 22 which has collar member 25 affixed thereon. Compression nut 27 carried by the straight conduit portion 22 then is threaded onto a male threaded fitting extending from the inlet of the meter 17. When the connection apparatus 11 and the meter and regulator are properly aligned, the nuts 27 and 33 are tightened to the meter 17 and the pressure regulator 14. Since the nut 27 and 33 are compression nuts, a gas tight seal is effected.

The above description and the accompanying drawings show that the present invention provides a novel meter connection apparatus that simplifies the installation of utility meters and particularly gas meters. The installation of the meter can be accomplished more quickly than with conventional procedures. Furthermore, the meter connection apparatus of the invention provides a unitary structure that can be used alone to effect the complete installation. No inventory of miscellaneous parts or components is needed for the installation.

The meter connection apparatus of the present invention enables an installer to install more meters per day easily and conveniently. Thus, fewer installers are required for a given number of meters with a resultant saving in salaries. As a result, the cost for each meter installed is significantly reduced. In addition, the meter connection apparatus itself is relatively inexpensive because of the simplicity of its design and the fact that it can be fabricated from commercially available components and materials. Also, since the apparatus is a unitary structure, the possibility of leaks is reduced to a minimum. Thus, the apparatus is safer in use.

It will be apparent that various modifications can be made in the particular meter connection apparatus described in detail above and shown in the drawings within the scope of the invention. For example, the size and configuration of the apparatus can be changed to meet specific requirements. Also, the materials utilized in the fabrication of the connection apparatus can be selected for the particular application. Therefore, the scope of the invention is to be limited only by the following claims.

What is claimed is:

1. Meter connection apparatus including a generally semicircular conduit portion with first and second substantially parallel straight conduit portions extending from the ends of the semicircular conduit portion, said semicircular conduit portion having a radius which is a plurality of the conduit diameter, a collar member affixed adjacent the free end of the first of said straight conduit portions, said collar member including a peripheral flange section, said first straight conduit portion extending beyond said flange section of said collar member, a compression nut carried by said first straight conduit portion and associated with said collar member, said compression nut including an internally threaded portion of a size encompassing and extending beyond said flange section of said collar member, said compression nut also including a portion of smaller size than said internally threaded portion engageable with said flange section, an enlarged conduit portion extending from the second of said straight conduit portions, said enlarged conduit portion being large relative to said second portion, said enlarged conduit portion including an externally threaded second section at its free end engageable with an internally threaded compression nut, and the end portion of said externally threaded section including a tapered section of reduced diameter as compared with said enlarged portion providing an internal tapered section engageable with a resilient seal member disposed between said enlarged conduit portion and said second compression nut, said seal member including a tapered section adjacent said enlarged conduit portion engageable with said internal tapered section thereof.

2. Meter connection apparatus according to claim 1 wherein said first compression nut is held captive on said first straight conduit portion by said collar member.

3. Meter connection apparatus according to claim 1 wherein said enlarged conduit portion extends from said second straight conduit portion a significant distance beyond that which said collar member extends from said first straight conduit portion.

4. Meter connection apparatus according to claim 1 wherein the diameter of said enlarged conduit portion is approximately twice the diameter of said conduit of said semicircular conduit portion.

5. Meter connection apparatus according to claim 1 wherein the radius of said semicircular conduit portion is approximately three times the diameter of the conduit thereof.

6. Meter connection apparatus according to claim 1 wherein said seal member is formed of an elastomeric material.

7. Meter connection apparatus according to claim 1 wherein said seal member includes a generally cylindrical metal covered section engageable with said second compression nut.

* * * * *